Patented May 16, 1933

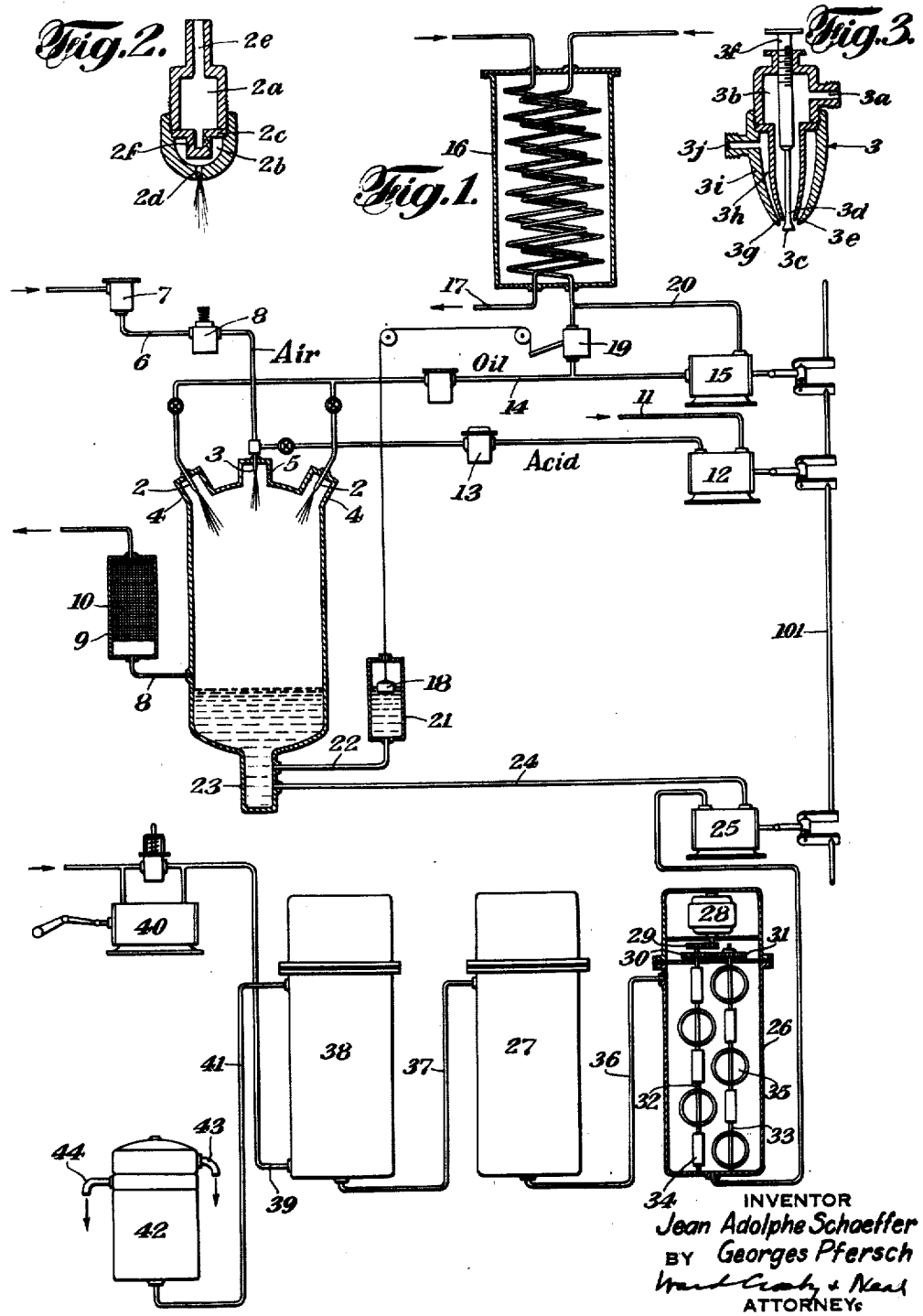

1,908,923

UNITED STATES PATENT OFFICE

JEAN ADOLPHE SCHAEFFER AND GEORGE PFERSCH, OF BEYNES, FRANCE, ASSIGNORS TO COMPAGNIE TECHNIQUE DES PÉTROLES, OF PARIS, FRANCE, A CORPORATION OF FRANCE

APPARATUS FOR TREATING LIQUIDS

Application filed February 29, 1932, Serial No. 595,926, and in France September 23, 1930.

This invention relates to an apparatus for treating liquids and particularly for treating oils such as hydrocarbon, vegetable and other oils with acids and other reagents. A process which may be carried out by this apparatus is also described but not claimed herein. Claims for this process are contained in a copending application Ser. No. 595,927 filed February 29, 1932.

Apparatus heretofore employed in the refining of hydrocarbon oils, such as lubricating and other fractions of the petroleum distillates employed, has a series of tanks into which the oil to be refined was placed and sulfuric acid of the proper strength added in one or more operations. The acid caused a reaction for the removal of asphalt and other constituents and after a period of vigorous agitation and settling, sludge collected at the bottom of the tank. Each tank was provided with a valved opening at the bottom so that the heavy material precipitated by the acid and which contained also considerable proportions of oil and acid could be drawn off. Thereupon the supernatant oil free from sludge could be neutralized.

The above mentioned apparatus as will be obvious required considerable labor to operate it. By its use it was difficult to secure efficient separation of the constituents removable by acid.

The principal object of the present invention accordingly is to provide a simple inexpensive and efficient apparatus for refining oil by such treatment which shall substantially eliminate disadvantages mentioned in the use of such apparatus employed for this purpose.

This application is a continuation in part of our copending application Ser. No. 513,733, filed February 5, 1931.

The invention accordingly comprises the novel apparatus and combinations thereof, specific embodiments of which are described herein by way of example only and in accordance with the manner in which we now prefer to practice the invention.

Further and more specific objects, features and advantages clearly appear from the detailed description given below taken in connection with the accompanying drawing which forms a part of this specification and illustrates by way of example one embodiment of the invention. In the drawing, Fig. 1 represents a diagrammatic elevation of a preferred embodiment of the invention. Fig. 2 represents a detail view of one of the oil spray nozzles. Fig. 3 represents a detail view of one of the acid spray nozzles.

Referring now particularly to this drawing, 1 indicates a substantially cylindrical chamber for mixing and settling oil and acid. The oil is introduced through a series af oil atomizers designated as 2, which are circumferentially spaced near the upper edge of the cylinder at about equi-distance from one another. Centrally disposed on the top of the chamber 1 is an acid atomizer 3. Atomizers 2 and 3 are located as shown in the outermost heads of drum-shaped hoods 4 and 5 respectively, the opposite end of each hood communicating directly with the interior of the chamber 1. The nozzles 2 are of a special type as shown in greater detail in Fig. 2. Each comprises a hollow cylindrical body $2a$ which is separated from a chamber $2b$ by means of a diaphragm $2c$. The liquid forced through pipe $2e$ under the effect of pressure, can only escape to chamber $2b$ through a row of slots $2f$ which are not perpendicular to the axis, but tangential. The liquid passing through these slots thus acquires a quick revolving motion, and the combination of this revolving motion within chamber $2b$, with the effect of the pressure applied, disperse the jet through opening $2d$ in form of a cloud or mist of very finely divided droplets.

These nozzles are preferably supplied with oil under pump pressure. The acid nozzle 3 is also of a special type as shown in Fig. 3. It is supplied with acid pumped thereto either with or without air under pressure of approximately 0.1 to 1 kg. per square cm. It comprises the following parts: A hollow cylindrical body $3b$ terminated by a hollow cone $3e$ has two openings. Through opening $3a$ the liquid to be atomized is forced by pressure and $3d$ is the only outlet which consists in an annular slot limited between the conical button $3c$ and the edges of the concentrical hollow cone $3e$. The width of the annular slot $3d$ is adjustable with a screw $3f$ by means of which the button $3c$ can be set more or less close to the edges of the hollow cone $3e$. Another annular slot $3g$ terminates the concentrical space $3h$ limited between the hollow cone $3e$ and the hollow cone $3i$. Compressed air introduced through opening $3j$ escapes through the annular slot $3g$ at a point where it meets and disperses with violence the liquid discharged through the annular slot $3e$.

The nozzles described are capable of atomizing liquids passed therethrough to a fineness of particle size of about 0.005 mm. to 1 mm. in diameter. Nozzles of the type described were thus used in order to obtain the results below, although we believe that a variation in range of particle size produced thereby is permissible. It is preferable that the size of the reacting particles be not so large as to cause loss of oil and acid to vary to any considerable extent from that described below.

The nozzles 2 are directed inwardly and downwardly so that their axes projected form the elements of a cone while the center acid spray is along the longitudinal axis of the cone. The dimensions of this cone may be varied but as shown in Fig. 1 the axes meet at about one-third of the height of the chamber 1 from the top thereof. The atomizers 2 and 3 produce in the chamber a mixture of acid and oil fogs. The particles of this fog mixture are so fine that there is almost an immediate contact between all of the acid and all of the oil to form a substantially homogeneous mixture thereof, and as this fog descends in the chamber 1 it tends to settle out and deposit particles of liquid therefrom. This liquid collects in the bottom of the chamber 1 and rises to about the level there shown. Air is supplied to the nozzle 3 through the line 6 under pressure of approximately 0.5 kg. per square cm., being passed through the air sieve 7 to remove particles which might block the nozzle. This air passes out of the chamber 1 through a pipe 8 leading to an air filter chamber 9 filled with Raschig rings 10 or similar material to prevent the outflow of liquid therewith. The acid supplied to nozzle 3 is driven through an acid line 11 by pump 12. It passes through an acid filter 13 to remove any particles which might clog the nozzle 3.

The oil passes through a pipe line 14 to the nozzles 2 being forced through the line by pump 15. The pumps 12 and 15 are proportionating pumps, that is they may be adjusted to give the right proportion of acid and oil respectively at a given speed of rotation of their common shaft 101. Prior to reaching the pump or on the discharge line of the pumps the oil may be passed through a heat exchanger 16 through which heat exchanger a line 17 is adapted to carry steam or chilled brine or other temperature regulating medium in order to heat or cool the oil as desired. A control float 18 controls a by-pass valve 19 in a line 20 to by-pass the pump 15. This float member is in a chamber 21 connected by a pipe 22 with a short well 23 running from the bottom of chamber 1. The liquid rises in the chamber 21 to the same height as in chamber 1 and the float 18 floats on the top of this liquid. It is connected by a suitable means such as a chain to an arm operating the valve 19 and in case the level of the liquid becomes too high in chamber 1 and correspondingly in chamber 21 the valve opens so as to allow liquid to pass through the pipe 20 to by-pass the pump and reduce the amount of oil passing to the sprays 2. An alternative would consist in keeping the feed to the nozzles constant, but operating a by-pass across pump 25 opening the valve of this by-pass when the liquid level in chamber 1 tends to become too low, and shutting it when level becomes too high.

From the lower part of the well 23 through pipe line 24 the liquid passes through a pump 25 and to reaction chambers 26 and 27. Pump 25 is connected on the same shaft with pumps 12 and 13, which are set to deliver respectively acid and oil to the sprays in proper proportion and pump 25 being correspondingly set to pump away the acid-oil mixture. Each of the reaction chambers consists of an upright hollow cylinder with a motor 28 in a cap thereon. The lower end of the motor shaft has a gear 29 which meshes with a gear on top of shaft 32, which in turn through gear 30 which meshes with gear 31 operates shaft 33. On both shafts are mounted circular bands 34 and 35 respectively. Rings 34 are mounted at right angles with respect to the rings 35, so that they will not interfere with one another on rotation and will provide sufficient motion to prevent substantial settling of the oil-acid mixture pumped into the reaction chamber. As the shafts are rotating reverse in respect to each other, the tendency which each one of them would have to carry the liquid in a rotating motion, is counteracted by the other one, and any centrifuging effect is thus avoided, which would otherwise tend to throw heavier particles suspended in the liquid against the walls of the chamber. The speed of rotation of these rings 34 and 35 is approximately 200 to 400 R. P. M.

Liquid passes from the reaction chamber 26 to chamber 27 by pipe 36. From reaction chamber 27 it may pass by pipe 37 to a reaction and insolubilizing chamber 38. This chamber is supplied with water through a line 39, being pumped by pump 40. The amount of water is suitably regulated. The chamber 38 is also provided with a motor 28 and gear driven shafts 32 and 33 provided with rings 34 and 35 as in the case of the other reaction chamber.

The mixture passing from the insolubilizing chamber by pipe 41 passes to a centrifugal separator 42 running at high speed about 14,000 R. P. M. Acid-refined oil passes out of the pipe 43 and acid-sludges pass out of the pipe 44.

The process which we prefer to carry out in this apparatus and which is claimed in our copending application mentioned above, is as follows:—Oil (for example a lubricating oil having a viscosity of 400" Saybolt Universal viscosimeter at 100° F.) is heated to 80° F. by the heat exchanger 16 and is introduced under pump. pressure through the sprays 2 and 3 at the rate of approximately about 9 gals. per minute. The sprays deliver a fine smoke or fog into the chamber 1 and are met therein by the fine smoke or fog resulting from the spraying of sulfuric acid, for example 96% $H_2SO_4$ or other like refining reagent passing from the spray 3. Sulfuric acid of this strength for the treatment of the above oil is preferably passed through the spray at the rate of 0.2 gal. per minute. The fog of the mixed acid and oil descends and settles as a liquid in the bottom of the chamber, the air passing out of the chamber and away from the acid mixture. At this point in the process if a test tube of the mixture of acid and oil be taken, it will show a substantially homogeneous liquid, that is, there will not be any apparent stratification of any sulfuric acid and oil or the presence of insoluble products in suspension detectable by the naked eye.

In the form just mentioned it appears that the sulfuric acid and oil have assumed practically the form of a homogeneous solution and reaction between the materials to produce a sludge containing asphalt, coloring material, etc. should now be allowed to take place. We allow this reaction to take place for the production of these products while substantially preventing the settling out of the insoluble products. This is done by passing the acid or mixture to one or more reaction chambers, 26, 27 and 38 through which the liquid slowly passes, occupying a sufficient interval to allow the reaction between sulfuric acid and the products to be removed from the oil to take place. In order to prevent the settling mentioned, the ring agitators are used which continue to rotate and keep the liquid stirred up. For the oil mentioned above, the time of passage through the reaction zone or reaction chambers is approximately 10 minutes. Having passed through the reaction chambers, the material may pass through the insolubilizing reaction chamber 38 in which water is added to it at the rate of approximately 0.06 kg. per minute. This results in the final insolubilization of the asphalt and other products to be separated and the material is now ready to be separated which is done by passing it to a separator having speed of approximately 14,000 R. P. M. As shown the acid oil passes out separately from the asphaltic and other constituents.

The above description has been made in connection with a specific oil run under specific conditions. It is to be understood that the description is illustrative of the process and the process is not confined to the details there given. The strength of the sulfuric acid may vary from 10 to 100% by weight of $H_2SO_4$ content. The oils may be of various types, viz. gasoline, kerosene, transformer oils, spindle oils, neutral oils, machine oils, motor oils, cylinder oils, and the like.

We have obtained successful results with temperatures of the untreated oils ranging as low as 30° F. to as high as 160° F. The period for reaction in the reaction chamber or chambers will vary also according to the type of oil and this may be controlled by the rate of pumping. Other reagents may be employed such as sulfuric acid and in place of hydrocarbon oils vegetable oils or others to be subjected to reaction with such reagents may be used.

After the reaction between the oil and reagent, it is important that impurities be separated rapidly from the treated oil. For this purpose we employ, as indicated, a separation by centrifuge or we may submit the treated liquid to shock or any other force exercising a rapid separating effect on liquids of different densities, as set forth in copending application Ser. No. 513,733, filed Feb. 5, 1931.

In addition although we have described the treatment of hydrocarbon oils specifically, it is to be understood that the apparatus is not to be restricted thereto as we may treat other oils, such as vegetable oils and other materials thereby.

We have found that our process mentioned conserves time and expense, including particularly a marked lowering in oil losses and in amount of acid required. Below is given a table showing the results of tests on various types of oil as compared with the results obtained by employing the old process in which the acid was brought into contact with the oil in two "dumps" with intermediate settling. The acid employed in all of these tests contained 96% $H_2SO_4$. The table is as follows:

| Original oil | Viscosity | C. T. P. industrial treatment | | | Conventional industrial treatment | | |
|---|---|---|---|---|---|---|---|
| | | % of acid used | Losses of oil | Resulting NPA color | % of acid used | Losses of oil | Resulting NPA color |
| Transformer oil | 106″ S. U. at 100° F. (transformer oil.) | 9 | 2.8 | 1¼ | 12 | 10 | 1¼ |
| Lubricating neutral oil | 200″ S. U. at 100° F. | 3 | 5 | 4½ | 8 | 14 | 4½ |
| Lubricating spindle oil | 120″ S. U. at 100° F. | 3.25 | 5.6 | 2¾ | 8 | 7 | 3 |
| Lubricating neutral oil | 220″ S. U. at 100° F. | 2 | 4.5 | 3½ | 8 | 10.5 | 3½ |
| Lubricating neutral oil | 235″ S. U. at 100° F. | 2 3 1 6 8 2 | 5.7 6.2 6.4 7.1 8.5 5 | 4 3½ 2¾ 2½ 1½ 4½ | 8 | 10.5 | 3½ |
| Lubricating machine oil | 390″ S. U. at 100° F. | 2 | 5 | 4½ | 8 | 13 | 4½ |
| Lubricating machine oil | 400″ S. U. at 100° F. | 3 4 5 6 7 8 | 7 7.54 8.84 9.38 10.3 11.2 | 4 3½ 3 2¾ 2½ 2½ | 8 | 13 | 3½ |
| Lubricating motor oil | 79″ S. U. at 212° F. | 3 | 6.2 | 4½ | 5.5 | 12 | 4½ |
| Lubricating cylinder oil | 130″ S. U. at 212° F. | 5 | 10.2 | 6 | 9.5 | 17 | 6 |

Savings on the acid range from 30 to 70% of the consumption as compared with the conventional process. The savings on refined oil range from 20 to 80% of the oils recovered when using the conventional process. The oils obtained are acid oils free from substantially all insoluble particles resulting from the reaction. The acid index of these oils is low and is such that they may be immediately neutralized and decolorized with clay; or even the clay treatment by contact without neutralization may be employed without additional settling. The process is continuous enabling the treatment of large quantities of material in a relatively small time.

As stated above the apparatus which we prefer to employ in carrying out this process is as described above. In practice we have found it inexpensive to install and operate and highly efficient in action. It is capable of continuous operation and with its compact form is able to handle large quantities of material in a relatively small space.

Although we have described the feed from the well of the mixing chamber 1 as carried on by a pump and the supply of the water for insolubilization in the insolubilizing machine as also under pressure, it will be noted that the flow of materials through the reaction and insolubilizing chambers and to the separator may be carried on by gravity if desired.

While we have described our invention in considerable detail and with respect to preferred forms thereof, we do not desire to be limited to such details or forms since many changes and modifications may be made and the invention embodied in widely different forms without departing from the spirit and scope thereof in its broader aspects. Therefore we desire to cover all modifications and forms coming within the language or scope of any one or more of the appended claims.

What we claim as new and desire to secure by Letters Patent, is:—

1. In an apparatus for treating oils, in combination, means to atomize and mix an oil with a relatively immiscible reagent, means to collect the atomized particles in liquid form, means to agitate the liquid while reaction occurs said means being devised to coalesce the reacting materials, and means for continuously separating the products of the reaction.

2. In an apparatus for treating oils, in combination, a chamber, atomizers therein for a relatively immiscible liquid and liquid reagent to produce a substantially homogeneous mixture thereof, means to collect the mixture in liquid form, means to agitate the liquid while reaction occurs and mechanical means for substantially immediately separating the products of the reaction.

3. In an oil refining apparatus in combination, means to atomize and mix both an acid and a hydrocarbon oil, means to collect the mixture in liquid form, a reaction chamber for holding the liquid while reaction occurs between the oil and acid, and agitating device to agitate the liquid therein and centrifugal means for separating the oil from the products of the reaction.

4. In an oil refining apparatus in combination, a chamber, oil and acid atomizers at the top of said chamber to produce a substantially homogeneous mixture of acid and oil having a flow directed downwardly therein towards a bottom wall for collecting, a reaction chamber for holding the liquid while reaction occurs between the oil and acid, an agitating device to agitate the liquid therein and centrifugal means for separating the oil from the products of the reaction.

5. In an oil refining apparatus in combination oil and acid atomizers therein for producing a substantially homogeneous mixture of acid and oil fog, the lower part of said chamber serving to collect the atomized mixture as a liquid, a reaction chamber for receiving the liquid mixture and holding it until reaction occurs and means for receiving and separating the oil from the reaction products.

6. An apparatus according to claim 1 in which there is means to introduce an insolubilizing reagent into the liquid.

7. An apparatus according to claim 3 in which the reaction chamber is provided with a means for introducing water therein to insolubilize the reaction products.

8. An apparatus according to claim 3 in which a heat exchanger for heating or cooling the oil is provided.

In testimony whereof we have signed our names to this specification.

JEAN ADOLPHE SCHAEFFER.
GEORGE PFERSCH.

CERTIFICATE OF CORRECTION.

Patent No. 1,908,923.                                  May 16, 1933.

JEAN ADOLPHE SCHAEFFER, ET AL.

It is hereby certified that the name of the co-inventor in the above numbered patent was erroneously written and printed as "GEORGE PFERSCH" whereas said name should have been written and printed as "GEORGES PFERSCH" as shown by the records of the case in this office; and that the said Letters Patent should be read with this correction therein that the same may conform to the record of the case in the Patent Office.

Signed and sealed this 15th day of August, A. D. 1933.

M. J. Moore.

(Seal)                                          Acting Commissioner of Patents.

which there is means to introduce an insolubilizing reagent into the liquid.

7. An apparatus according to claim 3 in which the reaction chamber is provided with a means for introducing water therein to insolubilize the reaction products.

8. An apparatus according to claim 3 in which a heat exchanger for heating or cooling the oil is provided.

In testimony whereof we have signed our names to this specification.

JEAN ADOLPHE SCHAEFFER.
GEORGE PFERSCH.

CERTIFICATE OF CORRECTION.

Patent No. 1,908,923.    May 16, 1933.

JEAN ADOLPHE SCHAEFFER, ET AL.

It is hereby certified that the name of the co-inventor in the above numbered patent was erroneously written and printed as "GEORGE PFERSCH" whereas said name should have been written and printed as "GEORGES PFERSCH" as shown by the records of the case in this office; and that the said Letters Patent should be read with this correction therein that the same may conform to the record of the case in the Patent Office.

Signed and sealed this 15th day of August, A. D. 1933.

M. J. Moore.

(Seal)    Acting Commissioner of Patents.

CERTIFICATE OF CORRECTION.

Patent No. 1,908,923. May 16, 1933.

JEAN ADOLPHE SCHAEFFER, ET AL.

It is hereby certified that the name of the co-inventor in the above numbered patent was erroneously written and printed as "GEORGE PFERSCH" whereas said name should have been written and printed as "GEORGES PFERSCH" as shown by the records of the case in this office; and that the said Letters Patent should be read with this correction therein that the same may conform to the record of the case in the Patent Office.

Signed and sealed this 15th day of August, A. D. 1933.

M. J. Moore.

(Seal)

Acting Commissioner of Patents.